United States Patent
Collins

[15] 3,693,449
[45] Sept. 26, 1972

[54] DEVICE FOR SAMPLING MOLTEN METAL

[72] Inventor: William J. Collins, 7005 Madison St., Merrillville, Ind. 46410

[22] Filed: Nov. 30, 1971

[21] Appl. No.: 203,168

Related U.S. Application Data

[62] Division of Ser. No. 61,625, Aug. 6, 1970, Pat. No. 3,656,338.

[52] U.S. Cl..................................73/354, 73/DIG. 9
[51] Int. Cl................................................G01n 1/12
[58] Field of Search...........73/17, 354, DIG. 9, 425.4

[56] References Cited

UNITED STATES PATENTS

| | | | |
|---|---|---|---|
| 3,455,164 | 7/1969 | Boyle | 73/354 |
| 3,481,201 | 12/1969 | Falk | 73/425.4 R |
| 3,559,452 | 2/1971 | Perbix | 73/425.4 R |

*Primary Examiner*—S. Clement Swisher
*Attorney*—Charles S. Penfold

[57] ABSTRACT

Apparatus of the type in which a sample receiving means is positioned in the end of an elongated tube intended to be dipped into a body of molten metal. The sample receiving means along with a thermocouple is supported in a mass of cement surrounded by a sleeve inserted into the end of a hollow tube.

11 Claims, 12 Drawing Figures

PATENTED SEP 26 1972  3,693,449
SHEET 1 OF 3
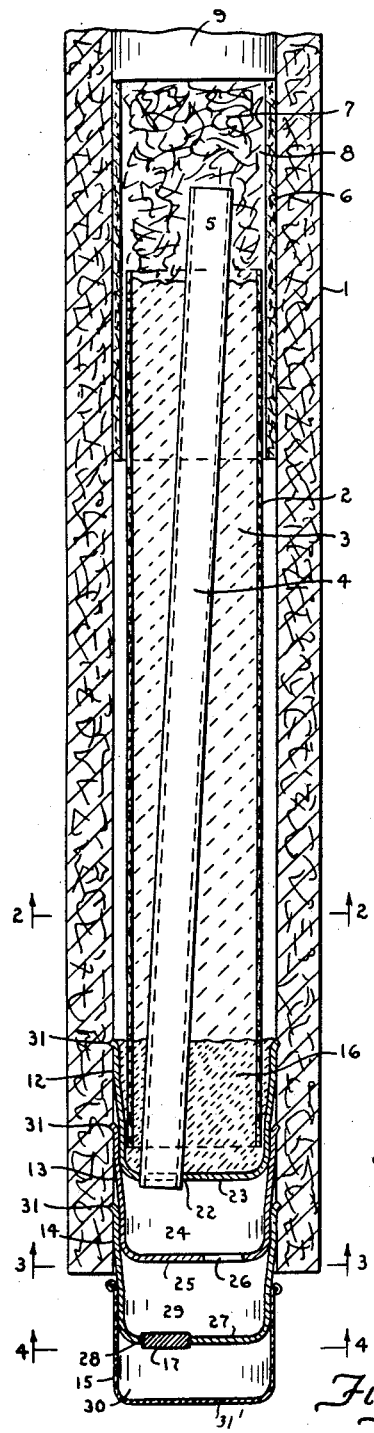
Fig.-1
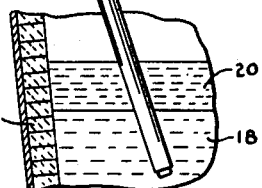
Fig.-2
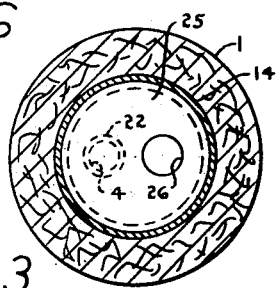
Fig.-3
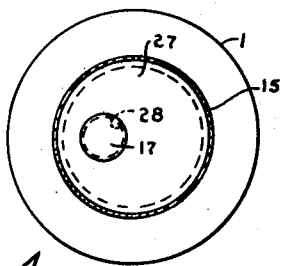
Fig.-4
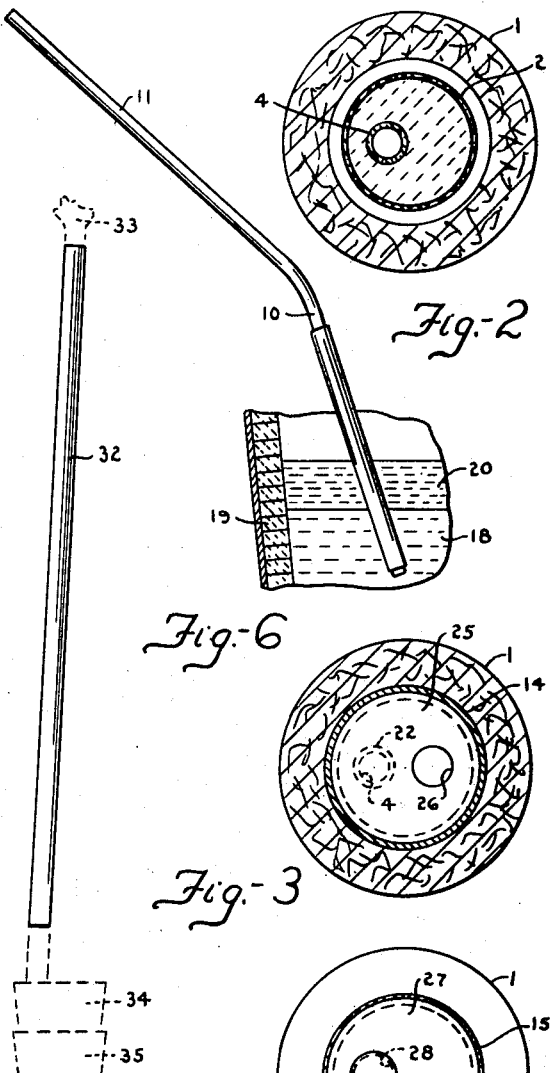
Fig.-5
Fig.-6

PATENTED SEP 26 1972 3,693,449

DEVICE FOR SAMPLING MOLTEN METAL

This application is a division of my application, Ser. No. 61,625, filed Aug. 6, 1970 now U.S. Pat. No. 3,656,338.

The subject invention relates generally to means utilized in conjunction with testing equipment and more particularly is directed to a device which is adapted for use in obtaining a sample of molten metal from a chamber for analysis.

The device may be employed wherever applicable and has proven very efficient and reliable in obtaining samples of molten metal for chemical analysis of all of its elements including the amount of gases, such as oxygen, hydrogen and nitrogen contained therein may be ascertained. The sample may be obtained from any chamber such as an open hearth furnace, a basic oxygen vessel, electric furnace or related metal making facility. The sample obtained may also be tested to determine its physical characteristics.

A particularly important object of the invention is to provide a device which, among other things, is provided with means for receiving a sample of a hot liquid and a thermocouple which is operatively associated with the receiving means.

A specific object of the invention is to provide a device comprising an elongated outer cylindrical tubular housing which has an internal diameter or cross-dimension greater than the majority of housings shown in my application, Ser. No. 61,625, and an upper extremity thereof is provided with means, such as an insert, whereby to compensate for the dimensional differences and facilitate connection of a wand to the device.

An additional object is to provide a device having an outer tubular housing of the character, above referred to, in which the receiving means and thermocouple are carried by an inner sleeve or tube to provide a unit or subassembly, which is readily insertable into a lower extremity of the housing for attachment thereto.

Additional objects reside in providing a device which offers advantages with respect to manufacture and assembly, efficiency, durability, safety, and destruction whereby to obtain access to the recovered specimen.

Other objects and advantages of the invention will become apparent after the description hereinafter set forth is considered in conjunction with the drawings annexed hereto.

Referring to the drawings:

The disclosures with respect to FIGS. 1 through 11 are for reference purposes only and are not claimed in the subject application.

FIG. 1 is a vertical sectional view of the device, with an end portion broken away;

FIG. 2 is a transverse section taken substantially on Line 2—2 of FIG. 1;

FIG. 3 is a transverse section taken substantially on line 3—3 of FIG. 1;

FIG. 4 is a transverse section taken substantially on line 4—4 of FIG. 1;

FIG. 5 is a view showing a specimen recovered from the device;

FIG. 6 is a view showing at least one mode of manipulating the device for use in obtaining a specimen or specimens from a vessel of molten metal, with only a portion of the vessel being shown;

Figure 7:
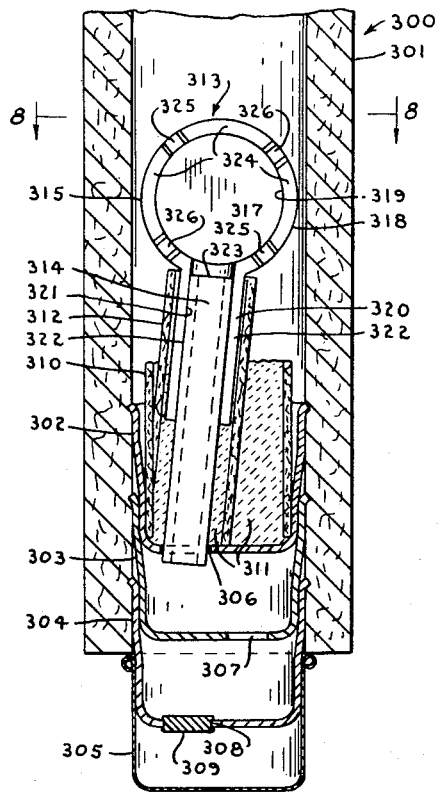
FIG. 7 is substantially a vertical section of a modified and improved device.

Referring particularly to FIG. 1, the device preferably comprises an outer elongate cylindrical tubular housing or jacket 1, an inner elongate cylindrical tubular casing 2 surrounding a mass of insulating material 3, an elongate cylindrical tubular member 4 substantially surrounded and carried by the mass and having an upper end 5 extending beyond the mass, a cylindrical tubular part 6 having a lower extremity surrounding an upper extremity of the casing 2 and an upper extremity extending therebeyond and about the end 5 of the member 4 to define a relief or escape chamber 7 which preferably contains a fibrous mass of material 8, and a socket 9 for detachably receiving an offset 10 of a wand 11 whereby the device may be manipulated.

The device shown in FIG. 1 also preferably includes a plurality of stacked cups or members 12, 13, and 14, and end cap or cup 15, a mass of high temperature cement 16 in the cup 12, and a fusible element 17 carried by the cup 14. The aforesaid components or parts will be described more in detail subsequently.

The outer housing 1 may be designed and constructed as desired but is preferably made from heavy cardboard so as to provide a rigid unit for protecting the inner structure substantially contained therein from the high temperature of the molten metal bath for a time sufficient to obtain the sample or specimen. This housing may be made in any size but preferably has an outside diameter of two and one sixteenth of an inch, an inside diameter of one and five sixteenths of an inch to provide a wall thickness of three eights of an inch, and a length of 34 inches. The aforesaid wall thickness has proven satisfactory in use and length in addition to affording sufficient space for the inner structure, serves to provide the socket 9, above referred to, so that a standard or conventional 1 inch pipe, of which the wand 11 is made, may be readily and snugly detachably received in the socket whereby to facilitate manipulation of the device. The wand is preferably of a length in the neighborhood of 10 feet to promote safety in dipping of the device, for example, into a molten steel bath 18 contained in the vessel 19, for penetration through a slag covering or layer 20 to a depth of about 15 or 20 inches as depicted in FIG. 6.

The tubular member 4 and mode of mounting or supporting the same will now be described. This member may be designed and constructed from any material and in any shape suitable for the purpose and provides a chamber or mold for receiving a quantity of the molten metal. More specifically, the member is preferably made from a glass known as Pyrex which will withstand high temperatures. The use of glass has proven particularly advantageous because it can be readily broken to obtain access to the solidified sample following recovery. The length of the member may be varied depending on the type or character of sample or specimen desired. The diameter of the member is preferably 10 millimeters or under in order to promote controlled cooling of the sample. The member may be internally tapered.

The glass tube 4 is preferably supported or imbedded in a diagonal position in the mass of material 3 which serves to protect and impart stability to the tube as well as support it within the confines of the outer casing 1. The mass 3 may be any material suitable for the purpose. Material, such as plaster of paris, has proven very satisfactory in use and in order to facilitate imbedment or moulding of the tube 4 in the mass, the latter is preferably molded from a plastic or flowable condition into a solid within the confines of the cylindrical tubular casing 2 as shown in the drawings.

The lower end of the casing 2 and the lower end of the glass tube 4 are preferably secured and sealed into the uppermost cup 12 by utilizing the mass of high temperature cement 16 which surrounds the lower ends of the tube and casing in such a manner that the end of the tube 4 extends through an aperture or port 22 provided in a bottom wall 23 of the cup 12. This opening has an axis which is spaced from the center of the wall.

The cement 16 is preferably of a refractory character and offers protection or insulation against the high temperature of the molten metal and promotes its upward flow in the tube 4, and the same is generally true of the mass 3. Otherwise expressed, the masses 3 and 16 serve to insulate and protect the glass tube and constitute a means whereby to promote or encourage uniform cooling of the molten metal as it travels upwardly in the tube.

The cup 13 is preferably connected to the uppermost cup 12 by a telescoping pressed fit so that the cups 12 and 13 are positioned in a nested sealing relationship and define a chamber 24, with the bottom wall 23 of the member 12 being disposed in axially spaced relationship to a bottom wall 25 of the cup 13. The bottom wall 25 constitutes a partition provided with an aperture or port 26 having an axis disposed in a position spaced from its center.

The cup 14 is preferably adapted to be connected to the cup 13 in a mode corresponding to that connecting the cups 12 and 13 and it has a bottom wall 27 constituting a partition provided with an aperture or port 28 having an axis disposed in a spaced relation to the center of this wall. The fusible means or element 17, above referred to, is preferably made of aluminum and is preferably secured in the aperture 28 by a peening or upsetting operation. It will be observed that the bottom wall 27 of the cup 14 is disposed in axially spaced relationship to the wall 25 of the cup 13 and that these cups define a chamber 29.

The cap 15, above referred to, is also preferably made in the form of a cup and is preferably adapted to be press fitted into nesting relationship with the cup 14 and defines in combination therewith a chamber 30. This cap is preferably made of metal of such a character that it will at least become partially disintegrated or ruptured when immersed in the molten metal. In order to facilitate attachment of the cap to the cup 14, the bottom wall of the cap is preferably provided with a relatively small aperture 31 constituting a vent to prevent the release of air from the chamber 30 when the cap 15 is pressed into the cup.

Attention is directed to that fact that the glass tube 4 is secured in an inclined position in the mass 3; that the lower end of the glass tube 4 and the opening 22 in the bottom wall 23 of the cup 12 are both generally aligned with the opening 28 and the fusible means 17, and that the opening 26 in the bottom wall or partition 25 of the cup 13 is disposed in a staggered or off-center position with respect to the axes of the openings 22 and 28 so that when the cap 15 is disintegrated or otherwise ruptured by the molten metal, the latter will melt the element 17 and thereby allow the metal to successively flow in a tortuous path through the aperture 28 into the chamber 29, the aperture or port 26 into the chamber 24 and thence upwardly into the glass tube 4 and out its upper end 5 into or against the fibrous mass or baffle 8. The element 17 serves to deoxidize the molten metal received in the tube or receiving means 4 or that amount of metal which is expected to form the final specimen. It is believed that this deoxidation serves to promote homogenity. The metal is deoxidized in the chamber 29 and is mixed by turbulence in the chamber 24 prior to entry in the tube 4. Attention is also directed to the fact that the cup members 12, 13, 14, and the cap 15 constitute a fabricated lower chamber structure and that this structure including the casing 2, mass 3, and glass tube 4 are all connected together to preferably provide a subassembly or unit which is adapted to be pressed into connection with the outer housing 1 of the device. More specifically in this regard, the unit or subassembly is adapted to be pressed into the housing in such a manner that sharp edges of rims 31 formed on the cups 12, 13, and 14 will automatically bite or indent themselves into the material defining the internal cylindrical surface of the housing to lock the subassembly in a desired operative position as exemplified in FIG. 1 of the drawings. The cap 15 may be attached to the cup 14 before the subassembly or unit is pressed into connection with the housing as just described, but it is preferably applied to the cup 14 after the other components of the unit have been mounted in the housing. Obviously, the unit may be secured or mounted in other ways. For example, it may be cemented in place.

Referring now to the procedure in obtaining or recovering a specimen, the preferred method comprises plunging or dipping the device into the molten bath, through the layer of slag or impurities 20 so that the lower end of the device is below the layer as evidenced in FIG. 6. The long wand 11 is utilized to manipulate the device and the device is preferably held in the bath for a very brief period of time, for example, a period of from 3 to 10 seconds which causes the cap 15 to be blown free, or otherwise disintegrate or rupture, due to the expanding trapped air in the chamber 30, resulting from the enormous temperature change from, for example, from 70° to 2,900° Fahrenheit of metal bath.

The cap and mass of cement 16 serve to momentarily insulate the interior of the device as it is being inserted into the molten metal and the cap protects the device against the premature admission of any slag and/or any other surface impurities until the lower end of the device is well below the layer 20. As the cup disintegrates or otherwise enables the molten metal to melt the element 17, the latter diffuses into the molten metal for deoxidizing the same and the two are mixed or conditioned as they successively tortuously flow through the apertures or port 28, chamber 29, port 26 and chamber 24 into the glass tube 4. Deoxidation substantially occurs in the chamber 29 and the mixing substantially in the chamber 24, although some mixing does occur in the chamber 29 prior to entry of the metal into the chamber. The metal thus treated, conditioned or deoxidized flows upwardly through the tube and against the fibrous or baffle means 8 in the upper chamber 7, allowing air to pass through the fibrous means while substantially preventing any great quantity of metal to flow into the chamber. After a few seconds or a sufficient time interval has elapsed in order to permit filling of the tube 4, the device is quickly lifted from the bath of molten metal and then may be subjected to a cooling medium, such as cold water, a blast of cool air or it may be placed on a work bench and allowed to cool. In any event, the specimen retrieved from the molten bath is not utilized until after it has solidified and cooled to such an extent that it can be operated on for analysis. The specimen or sample solidifies or begins to solidify while the device is immersed in the molten metal. It is desirable that the analysis of the specimen be obtained expeditiously so that it may be quickly analyzed in order to determine or ascertain whether the molten metal is in accord with preselected or predetermined specifications or requirements. If, for example, the specimen indicates that the molten metal is not of the character desired, then the metal in the vessel 19 may be modified or changed. In some instances, it may become necessary to obtain more than one sample or specimen of the molten metal before the latter is brought up to a required standard.

The device, upon being subjected to the molten metal, deteriorates or becomes damaged to the extent that at least a portion of the outer housing is burned away, charred or disintegrated so that, in some instances, a portion of the mass of material disposed about the glass tube may be visible. Also, the cap 15, in some instances, may be completely disintegrated into the molten metal and in other instances, a portion of the cap may still remain attached to the cup 14. Moreover, in some instances, portions of the cups 13 and 14 may disintegrate. In other words, the disintegration or destruction of various components of the device is dependent to their design and construction, the temperature of the molten metal, and the time that the device is held in the latter.

After the device is removed from the molten bath, the outer housing is cut or otherwise broken apart to obtain the subassembly, after which the tubular part 6, fibrous material 8, mass 3, tube 4, cement 16 and cups 13 and 14 may be removed and/or destroyed in any mode or order desired so that there remains a specimen having an elongate cylindrical portion 32, an end portion 33 and a pair of joined enlarged end portions 34 and 35 as exemplified in FIG. 5. The end portion 33 is formed by metal entering the chamber 7 and the end portions 34 and 35 by the chambers 24 and 29. Any portion of the specimen may be utilized for analysis, but the portion 32 which was formed within the confines of the glass tube is preferably utilized after the end portions 33, 34, and 35 are removed as indicated by the dotted lines.

Figure 8:
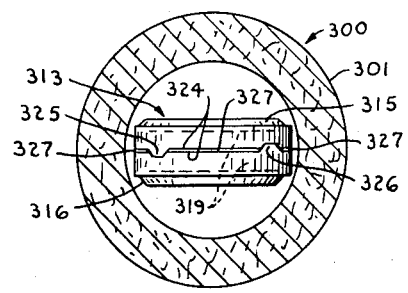
FIG. 8 is a horizontal or transverse sectional view taken substantially on line 8—8 of FIGURE 8.
Figure 10:
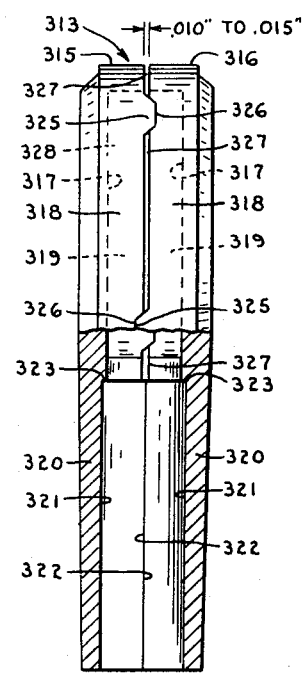
FIG. 10 is a side elevational view of the subassembly shown in FIG. 9.

The modified sampling device as exemplified in the FIGS. 7 and 8 of the drawings, except for variations in the relative sizes and in a reduction in the number of certain components utilized, substantially corresponds to the device previously described.

The device generally designated at 300 shown in FIG. 7 excludes, for example, the part 6 and mass 8 illustrated in FIGS. 1 through 6. More specifically, the device 300 includes an outer jacket or tubular housing 301, constructed of some desirable material such as heavy cardboard, corresponding to the jacket 1 in FIG. 1 and a plurality of cups 302, 303, 304, 305 which are constructed, operatively connected and supported for the same purpose as the corresponding cups shown in FIG. 1.

The bottom wall of the innermost cup 302 is provided with an aperture 306, the bottom wall of the cup 303 with an aperture of 307, and the bottom wall of the cup 304 with an aperture 308 in which is secured a fusible or meltable element 309. It will be observed that aperture 307 is offset with respect to a line extending through the axes of the apertures 306 and 308.

The device 300 also preferably includes a relatively short tube 310 which is preferably firmly secured in the innermost cup 302 by a mass of high temperature cement 311. An inner tube 312 having a diameter less and a length greater than the tube 310 has a lower extremity firmly secured by the cement in the tube 310 and cup 302 and against the bottom wall of the latter in general alignment with the aperture 306. In practice these tubes 310 and 312 are constructed from cardboard, but it is to be understood that any material suitable for this purpose may be utilized. It will be observed that inner portions of the tube 310 and the mass 311 project inwardly beyond the confines of the cup 302 whereby to lend support for the tube 312 and associated components which will now be described.

The device 300 further includes a receiving means or mold structure, generally designated 313, preferably of powdered metal, and an inner tube 314 preferably constructed from Pyrex Glass. It is to be understood that any materials which will withstand high temperatures may be utilized.

The receiving means or mold structure 313 may be designed and constructed in various ways but as exemplified in FIGS. 7 through 10, it is preferably comprised of a pair of half or complementary sections 315 and 316. The tube 312, above referred to, constitutes means for maintaining or holding the sections assembled. Each of the sections preferably includes a relatively large annular portion having a bottom wall 317 and said wall structure 318 which define a pocket or recess 319. Each section also preferably includes an integral radial or tapered lateral continuation 320 provided with a semicylindrical groove 321 extending throughout the length of the continuation. Attention is directed to the fact that continuations have opposed longitudinally extending planar edges 322 and that the inner ends of the groove are provided with abutments 323.

The end surface of each of the wall structures of the sections is planar as indicated at 324 and interrupted by a pair of diametrically disposed projections 325 and a pair of diametrically disposed notches or recesses 326 the latter of which are circumferentially spaced 90° apart from the projections. The receiving means or mold structure 313 is preferably so designed and constructed that when the sections are correctly held in assembled relation by the tube 312 which is telescoped into a snug surrounding relationship with the tapered continuations 320, the opposed planar surfaces 322 of the continuations will be held in intimate bearing relationship and the projections 325 will be disposed in interfitting or interlocking relationship with the notches 326 whereby to maintain the marginal end surfaces 324 of the wall structures of the sections in a predetermined spaced parallel relationship so that preferably a plurality of three circumferentially spaced arcuate vents or openings 327 are provided through which a fluid such as gas or air may escape when the molten metal is received in the mold structure.

Experimentation and testing has proven that the optimum gap, spacing, or size of the vents or openings should be within a range of 0.010 to 0.015 inches for sampling basic oxygen processed steels due to their higher temperatures. More particularly in this respect, it was initially believed that no vent openings were essential on the basis that the heat of the molten metal would cause the mold sections to separate and release the trapped gases. However, failures did occur in practice so tests were conducted which proved that the size of the vent or vents was critical. It was discovered that a relatively small vent or a narrow gap between the large portions of the sections caused back pressure and restrained the molten metal from entering and completely filling the receiving means or mold cavity. It was further discovered that a vent of relatively large size or an excessive gap between the large portions of the sections caused the molten metal to bleed through the vent and seal the sections together thereby resulting in obtaining a porous test sample of poor quality. Further, exhaustive tests support the conclusion that a gap between opposed surfaces of the large portions of the sections within a range of between 0.010 to 0.015 is the most efficient insofar as sampling basic oxygen processed steels in view of their higher temperatures.

Attention is directed to the fact that the projections and notches constitute means which assist in assembling, locating, aligning, or placing the sections in registry; that the pockets 319, in combination, define a chamber 328 which finally receives the molten metal; that the longitudinal grooves 321 in the continuations, in combination, define a tubular formation or socket which snugly receives one extremity of the glass tube 314 which engages the abutments 323 for limiting inward movement of the tube; and that the lower extremity of the glass tube extends beyond the continuations and through the aperture 306 in the cup 302, and is secured in place by the surrounding cement 311 in the tube 312. It will be apparent that the tube 312 is also firmly anchored in place by the cement 311; that the cement within the confines of the tube 312 assists in sealing and securing the glass tube in the socket, the inner ends of the continuations together and the glass tube in the aperture 306 so that the molten metal will flow only through the glass tube prior to reception in the chamber 328 of the receiving means 313. It will be observed that the longitudinal axis of the receiving means 313, glass tube 314 and the tube 312 are coincidental and inclined with respect to the longitudinal axis of the outer jacket 301. It is to be understood that the device may be made in which the aforementioned axes may be in alignment with the longitudinal axis of the jacket or parallel thereto.

Figures 9, 11:
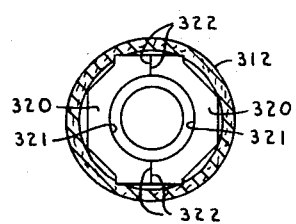
FIG. 9 is an end view of a subassembly of certain components utilized in the device shown in FIG. 7.
FIG. 11 is a perspective view showing the resultant sample obtained by utilizing the device.

The device has proven most efficient in use in obtaining a precision case circular disc 239 attached to a 10 mm. diameter stem 330 as exemplified in FIG. 11. Due to the circular shape of the disc, the sample is unilaterally cooled, promoting an equiaxilar columnar grain structure which is beneficial to chemical and physical analyses. Further, the shape and thickness of the disc-like portion 329 of the sample and its resultant structural characteristics offers an ideal section for spectrographic analysis in addition to those just referred to. Moreover, the stem of the device has been designed and constructed for gas or carbon analysis. The material and mass of the mold determine the cooling characteristics of the resultant cast sample.

After the sample more or less in a lollypop form has been cast, certain of the various components such as the sections 315 and 316, glass tube 314 may be readily separated, destroyed, disintegrated, or broken apart so as to obtain the sample structure exemplified in FIG. 11 after which that portion 331 illustrated in dotted lines may be removed so that the remainder of the lollypop like sample may be subjected for analyses as above described.

In view of the foregoing, it should be manifest that the structure illustrated in FIGS. 7 through 10, among other things, comprises an outer jacket or housing 301; an inner tube 314 which is supported by a mass of material 311 which is highly resistant to heat deterioration; that the means 313 is disposed within the confines of the housing and is provided with a chamber 328 which communicatively connects with the upper end of the tube 314; that means which may comprise one or more of the cups 302, 303, 304 provide at least a second chamber which communicatively connects with the lower end of the tube 314 for initially receiving a liquid for transmission into said tube and the chamber 328; and what means, such as the fusible element 309, serves to condition the fluid in the second chamber prior to its reception into the tube 314.

Figure 12:
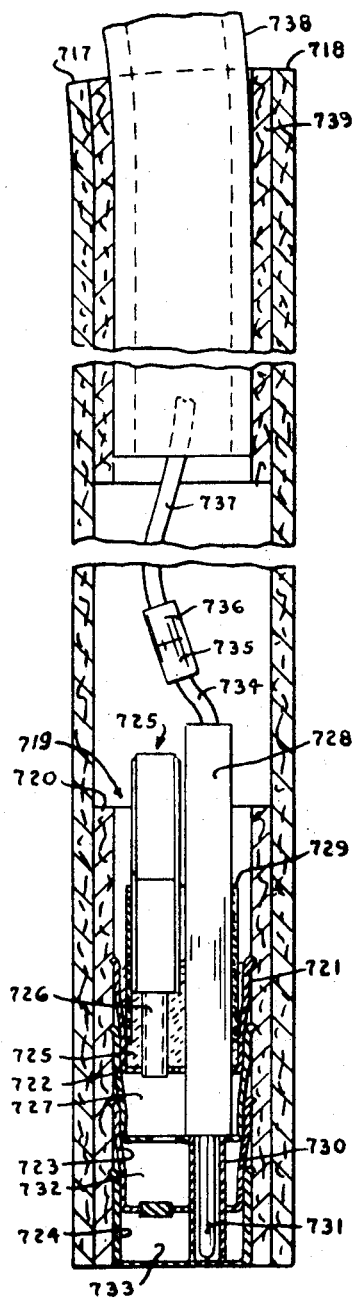
FIG. 12 is a vertical section taken through a device, embodying the subject invention, showing a unique way of connecting a subassembly or unit to a housing therefor and means for connection with a wand whereby to facilitate manipulation of the device.

FIG. 12 depicts a modified device 717 having an elongated tubular cylindrical housing 718 which has an internal diameter or cross-dimension greater than the majority of the housings above referred to, so that a subassembly or unit comprising structure generally designated 719 and a lower sleeve or insert 720 carrying 719 may be readily inserted and connected to or within the confines of the housing by any means suitable for the purpose, such as an adhesive or staples.

More specifically, the structure 719 preferably comprises a plurality of cups 721, 722, 723 and a cup or cap 724. The cups of the device 717 preferably have rims which bite or otherwise engage an internal cylindrical surface of the sleeve 720 for anchoring the cups therein. The cup 721 contains cement 725 and serves to anchor a receiving means 725 in relation to the cup and so that a tubular member or extension 726 thereof extends through a bottom wall of the cup 721 into a chamber 727 formed by the adjacent cup 722. A cylindrical tube 728 is partially embedded in the cement 725 and extends through the cup 721 and has a lower end resting on a bottom wall of the cup 722. A tubular member 729 surrounds the receiving means 725 and the tube 728 and has a lower end embedded in the cement 725 whereby to assist in stabilizing the position of the receiving means and tube 728. A tubular element 730 preferably made from a suitable frangible material is disposed in the tube 728 and a lower extremity thereof extends through axially aligned openings respectively provided in the bottom walls of the cups 722 and 723 so that a lower end of the element finds support on a bottom wall of the cup or cap 724. A thermocouple 731 is disposed in the tubular element 730 and in the tube 728 so that portions of the thermocouple are located in the chamber 727, a chamber 732 formed by the cup 723 and in a chamber 733 formed by the cup or cap 724.

The device 717 is adapted to be dipped or immersed in a bath of hot liquid, such as molten metal, and this causes the cup or cap 724 to blow or at least partially disintegrate and melt the deoxidizing element carried by the cup 723 so that metal will successively flow into the chambers 733, 732, and 727 and about the thermocouple so that the temperature of the metal may be readily ascertained while the metal is also flowing into the receiving means 725.

A conduit 734 is disposed in the housing 717 and contains insulated conductors which extend into the tube 728 and element 730 for connection with wires of the thermocouple in a conventional manner. The conductors in the conduit 734 are connected to a male plug 735 for detachably assembly with a female plug 736. A conduit 737 contains insulated conductors which are connected to the plug 736 and are adapted for extension outwardly through a tubular wand or handle 738, the latter of which is adapted for detachable reception or connection with a means such as a receiving means or upper tubular insert or sleeve 739 which, of so desired, may be anchored in place in the same manner as the lower sleeve 720. In assembling the components of the device, the conduit 737 carrying the female plug 736 is first inserted downwardly through the wand 738 and housing so that the plug 736 may be connected to the male plug 735, after which the subassembly or unit comprising the structure 719 and lower sleeve 720 are inserted into the lower end of the housing and then secured in place. The upper insert 739 may be inserted into the upper end of the housing and secured in place prior to or after the unit is secured in place.

As alluded to above, the internal diameter or cross-dimension of the housing 718 is somewhat greater than the internal diameter or cross-dimension of the majority of the housings described above so that the structure 719 may be housed in a sleeve 720 and the unit comprising the structure 719 or sleeve 720 may as a unit be inserted into and secured in the lower end of the housing. This organization is unique in that the majority of the structures above described which have an overall cross-dimension corresponding to the structure 719 may be housed in a sleeve like 720 for securement in a housing having a diameter or size corresponding to the housing 718.

Attention is also directed to the fact that the upper sleeve 739 is of substantially the same diameter as the lower sleeve 720 and the sleeve 739 is unique in that it provides a receiving means having an internal diameter or dimension whereby to accommodate a wand 738, the latter of which, for example, may also be utilized for connection with a majority of the housings of the devices described above. More specifically, the upper sleeve 739 and lower sleeve 720 compensate for the difference in the internal diameter of the housing 718 so that the wand 738 which is adapted for use in conjunction with the majority of the housing above referred to may also be utilized for manipulating the device 717 and so that the structure 719 may be inserted into the housing 718 by utilizing the lower sleeve 720 in lieu of securing, for example, a structure such as 719 for direct connection in a housing in which the rims of the cups engage an internal surface thereof.

Having thus described my invention, it is obvious that various modifications may be made in the same without departing from the spirit of the inventions, and therefore, I do not wish to be understood as limiting myself to the exact forms, construction, arrangements, and combinations of parts herein shown and described.

I claim:

1. A device for the purpose described comprising: a housing, a subassembly comprising a sleeve, means supported in said sleeve for receiving a sample of molten metal, a thermocouple supported in said sleeve in relation to said receiving means, said subassembly being insertable into said housing whereby said sleeve may be secured thereto, and a second sleeve which is insertable into said housing for receiving an inner end of a wand.

2. The device defined in claim 1, in which said thermocouple is supported in said sleeve in a substantially parallel relationship to said receiving means with a lower end of the thermocouple being located below said receiving means.

3. The device defined in claim 1, including a tube which is secured in said sleeve for supporting said thermocouple, and conductor means which are operatively connected to said thermocouple and extends outwardly from said tube for connection with a recording apparatus located at a remote distance from said device.

4. The device defined in claim 1, in which said thermocouple is supported in a tube, said subassembly includes a cup containing a mass of cement, and said receiving means, and said tube are mounted in said mass.

5. The device defined in claim 1, in which said subassembly includes a first cup containing a mass of cement and a plurality of nested cups forming a plurality of chambers, said receiving means is mounted in said mass and communicatively connects with one of said chambers, and a tube supports said thermocouple so that the latter is disposed in one of the other chambers.

6. A device for the purpose described comprising: a housing, a subassembly comprising a sleeve, a mass of cement in said sleeve supporting means for receiving a sample of molten metal, a thermocouple supported in said mass in relation to said receiving means, said subassembly being insertable into said housing whereby said sleeve may be secured thereto.

7. The device defined in claim 6, including a second sleeve which is insertable into said housing for receiving an inner end of a wand.

8. The device defined in claim 6, in which said receiving means and said thermocouple are disposed in a substantially parallel relationship with a lower end of the thermocouple being located below said receiving means.

9. The device defined in claim 6, in which said thermocouple is supported in a tube located in said sleeve, said subassembly includes a mass of cement, and said receiving means and said tube are mounted in said mass.

10. A device of the kind described comprising an outer elongated tube, a lower sleeve disposed in said tube and supporting insulated means for receiving a sample of hot liquid and a thermocouple, and an upper sleeve disposed in said tube in axially spaced relation to said lower sleeve for receiving a wand whereby to facilitate manipulation of the device.

11. The device defined in claim 10, including conductors which are connected to said thermocouple and extend outwardly through said upper sleeve.

* * * * *